United States Patent [19]
Tsutsumi et al.

[11] Patent Number: 6,136,475
[45] Date of Patent: Oct. 24, 2000

[54] LITHIUM SECONDARY BATTERY AND CATHODE COMPOSITION THEREFOR

[75] Inventors: Masami Tsutsumi, Akashi; Hiroshi Horiuchi, Kakogawa; Tamotsu Yamamoto; Isao Watanabe, both of Akashi; Tsutomu Miyashita, Kobe, all of Japan

[73] Assignee: Fujitsu Limited, Kawasaki, Japan

[21] Appl. No.: 09/114,271

[22] Filed: Jul. 13, 1998

[30] Foreign Application Priority Data

Feb. 16, 1998 [JP] Japan ................... 10-033014

[51] Int. Cl.$^7$ ............... H01M 4/40; H01M 4/50; H01M 4/58
[52] U.S. Cl. ............ 429/231.95; 429/224; 429/218.1
[58] Field of Search ............... 429/209, 218.1, 429/232, 224, 231.95

[56] References Cited

U.S. PATENT DOCUMENTS 4,478,921 10/1984 Langan .
5,707,760 1/1998 Stux et al. ..................... 429/188
6,022,641 2/2000 Endo et al. ..................... 429/232

OTHER PUBLICATIONS

NIST Web Page Printout, http://webbook.nist.gov, Lithium Carbonate, Feb. 2000.
NIST Web Page Printout, http://webbook.nist.gov, Sodium Carbonate, Feb. 2000.

*Primary Examiner*—Maria Nuzzolillo
*Assistant Examiner*—Tracy Dove
*Attorney, Agent, or Firm*—Armstrong, Westerman, Hattori, McLeland & Naughton

[57] ABSTRACT

A lithium secondary battery includes a cathode which can be dischargeably charged with lithium ions, an anode made of lithium metal, a lithium alloy or any other anode material which can be releasably doped with lithium ions, an electrolyte which allows migration of lithium ions between both electrodes, and an endothermic substance which undergoes an endothermic reaction upon a temperature rise of the battery for preventing excessive heat generation. Typically, the endothermic substance is a metal carbonate such as magnesium carbonate, cobalt (II) carbonate, silver carbonate, cadmium carbonate or sodium hydrogencarbonate.

15 Claims, 7 Drawing Sheets

FIG.5
Thermal Decomposition of $CoCO_3$ (DSC)

FIG.8 Thermal Decomposition of NaHCO₃ (DSC)

LITHIUM SECONDARY BATTERY AND CATHODE COMPOSITION THEREFOR

BACKGROUND OF THE INVENTION

1. Field of the Invention

The present invention relates to a lithium secondary battery which may be used as a power source for retaining data in a memory of an electronic apparatus (e.g., a personal computer) or for driving a portable electronic apparatus (e.g., a portable telephone receiver). The present invention also relates to a cathode composition used for such a battery.

2. Description of the Related Art

As is well known, a lithium secondary battery comprises a cathode dischargeably charged with lithium ions, an anode and an electrolyte which allows migration of lithium ions between both electrodes. The anode may consist of lithium metal, a lithium alloy or any other material which can be releasably doped with lithium ions. Typically, the electrolyte may be a nonaqueous electrolytic solution which is prepared by dissolving a lithium salt in an organic solvent.

Due to the high energy density and the use of an organic solvent, a lithium secondary battery is known to have a problem of generating a large amount of heat under severe conditions. For example, the lithium battery generates heat at the time of compression (e.g., battery crushing under a heavy object), nail piercing (e.g., when erroneously driving a nail into the battery at the time of packaging), internal shorting, exposure to high temperature, or external shorting.

One way to solve such a problem is to provide a porous separator between the cathode and the anode, as disclosed in JP-A-54(1979)-52157 or JP-A-59(1984)-207230 for example. According to this solution, the pores of the separator are closed at the melting point of the separator material due to the fusion thereof, thereby interrupting the ion migration between the cathode and the anode. As a result, the current flow terminates to stop the temperature rise.

As an improvement to a lithium secondary battery incorporating a porous separator, JP-A-5(1993)-74443 discloses an arrangement wherein the separator has an excess portion projecting beyond the edge faces of the cathode and the anode, and wherein the excess portion of the separator is pressed down against the edge faces of both electrodes by an insulating plate which is thermally fusible to the separator. Such an arrangement prevents excess heat generation or thermal runaway which may occur through shorting between the cathode and the anode due to a shrinkage of the separator near the edge faces of both electrodes after the pores of the separator are thermally closed.

However, the prior art lithium secondary battery incorporating the porous separator operates properly for the prevention of excessive heat generation only when the separator is kept in its appropriate state. Therefore, the battery is incapable of preventing excessive heat generation if the cathode comes into direct contact with the anode upon rupture of the separator under crushing of the battery or if both electrodes are shorted via a nail which has penetrated through the separator. It should be noted that excessive heat generation in a lithium secondary battery occurs because the Joule heat generated at the time of shorting causes oxygen to separate from the cathode active substance for reacting with active lithium.

On the other hand, JP-A-7(1995)-78635 proposes the use, in a lithium secondary battery, of an electrolytic solution which contains $LiAsF_6$/1,3-dioxolane+tertiary amine. Normally, the tertiary amine prevents polymerization of 1,3-dioxolane. Conversely, when the temperature of the battery rises due to high-temperature exposure or shorting for example, 1,3-dioxolane starts polymerizing to increase the internal resistance of the battery, whereby the current flow decreases and the temperature of the battery drops.

However, the above-described electrolytic solution contains As in $LiAsF_6$. Therefore, sufficient care needs to be taken in handling the battery for preventing environmental pollution. Further, the electrolytic solution is known to decompose when the battery voltage increases to no less than 4V, so that the candidate materials for the cathode active substance are limited to those which make the charge terminating voltage of the battery below 4V. This is critically disadvantageous in increasing the energy density of the battery.

SUMMARY OF THE INVENTION

It is, therefore, an object of the present invention is to provide a lithium secondary battery which is capable of reliably preventing excessive heat generation even under severe conditions such as battery crushing, nail piercing, internal shorting, high-temperature exposure or external shorting without entailing the problems of the prior art lithium batteries described above.

Another object of the present invention is to provide a cathode composition which can be advantageously used for such a battery.

According to a first aspect of the present invention, there is provided a lithium secondary battery which comprises a cathode which can be dischargeably charged with lithium ions; an anode selected from a group including lithium metal, a lithium alloy and any other anode material which can be releasably doped with lithium ions; an electrolyte which allows migration of lithium ions between both electrodes; and an endothermic substance which undergoes an endothermic reaction upon a temperature rise of the battery for preventing excessive heat generation.

According to a preferred embodiment of the present invention, the endothermic substance comprises at least one metal carbonate which thermally decomposes upon a temperature rise of the battery. Examples of metal carbonate include magnesium carbonate, cobalt(II) carbonate, silver carbonate, cadmium carbonate and sodium hydrogencarbonate which are usable alone or in combination.

Of the above-enumerated metal carbonates, magnesium carbonate thermally decomposes according to the following reaction (1) when the battery undergoes crushing, nail piercing, internal shorting, high-temperature exposure or external shorting.

$$MgCO_3 > MgO + CO_2 \quad (1)$$

Cobalt carbonate thermally decomposes according to the following reaction (2).

$$COCO_3 \rightarrow CoO + CO_2 \quad (2)$$

Silver carbonate thermally decomposes according to the following reaction (3).

$$Ag_2CO_3 \rightarrow Ag_2O + CO_2 \quad (3)$$

Cadmium carbonate thermally decomposes according to the following reaction (4).

$$CdCO_3 \rightarrow CdO + CO_2 \qquad (4)$$

Sodium hydogencarbonate thermally decomposes according to the following reaction (5).

$$2NaHCO_3 \rightarrow 2Na_2O + H_2O + CO_2 \qquad (5)$$

All of the above reactions are endothenmic, which becomes clear by referring to the enthalpy change from the reactant and the products. In the reaction (1), for instance, the standard enthalpy of formation of magnesium carbonate (enthalpy of formation at standard state) is about −1,130 kJ/mol and the standard enthalpy of formation of magnesium oxide is about −600 kJ/mol, whereas the standard enthalpy of formation of carbon dioxide is about 400 kJ/mol. Thus, the enthalpy change from the reactant to the products is about +130 kJ/mol, which means that the react ant needs 130 kJ/mol for decomposition. This calculation is made on the assumption that the reaction occurs under standard state. In reality, the thermal decomposition occurs with a temperature rise, so that the actual enthalpy change deviates somewhat from the above calculation. However, there is no doubt that the above decomposition is endothermic. Further, the inventors have confirmed through the differential scanning calorimetry that each of the above thermal decomposition reactions is endothermic, as hereinafter described.

In summary, the metal carbonate as the endothermic substance prevents excessive heat generation of the lithium secondary battery due to the following two functions. First, the endothermic nature, in thermal decomposition, of the metal carbonate directly prevents excessive heat generation of the battery. Secondly, since the thermal decomposition of the metal carbonate is accompanied by generation of carbon dioxide which provides a reluctantly oxidizing atmosphere, lithium from the anode reluctantly reacts with oxygen which would be liberated from the cathode active substance upon a temperature rise of the battery, thereby preventing excessive heat generation of the battery in an indirect way. In this regard, the inventors have experimentally confirmed that the metal carbonate does not hinder the cell reaction in the lithium secondary battery.

The endothermic substance (e.g., metal carbonate) may be contained in the cathode. Generally, the cathode comprises a composition which contains a cathode active substance for releasably occluding lithium ions, an electrically conductive agent for enhancing the electric conductivity of the cathode, and a binder for binding the cathode active substance and the conductive agent together. Therefore, metal carbonate powder as the endothermic substance may be contained in the cathode composition by utilizing the adhesion of the binder.

The proportion of the added metal carbonate in the cathode composition preferably lies in the range of 0.1~20 wt %. A proportion below 0.1 wt % results in insufficiency of preventing excessive heat generation of the battery. A proportion beyond 20 wt % results in a decrease of the battery capacity while reaching the ceiling (upper limit) in preventing excessive heat generation of the battery.

Examples of cathode active substance include $LiCoO_2$, $LiNiO_2$, $LiMnO_2$, $LiMn_2O_4$ and $V_2O_5$. However, the present invention is not limited to these examples.

Examples of electrically conductive agent include acetylene black and graphite. However, these examples are not limitative, and other conductive agents used for the cathode composition of a known lithium secondary battery are also usable for the battery of the present invention.

Examples of binder include poly(vinylidene fluoride) (PVDF), polytetrafluoroethylene (known as "Teflon") and ethylene-propylene-diene ternary copolymer (EPEM).

On the other hand, the endothermic substance may be alternatively or additionally contained in the anode. In this case, metal carbonate powder as the endothermic substance is mixed with a suitable binder (which is similar to the binder of the cathode composition), and the resulting mixture maybe applied to a surface of lithium foil, a lithium plate or a lithium alloy plate (e.g., lithium-aluminum alloy, lithium-tin alloy or lithium-lead alloy).

Further, the endothermic substance may be contained in the electrolyte. For instance, metal carbonate powder as the endothermic substance may be contained in a solid electrolyte such as polyethylene oxide (PEO).

The electrolyte may comprise a nonaqueous electrolytic solution which is prepared by dissolving a lithium-ion-conductive solute in an organic solvent. Examples of lithium-ion-conductive solute include $LiPF_6$ (lithium hexafluorophosphate) and $LiBF_4$ (lithium tetraborate), $LiClO_4$ (lithium perchlorate). Examples of organic solvent include propylene carbonate (PC), tetrahydrofuran (THF), ethylene carbonate (EC), 1,2-dimethoxyethane (DME), diethyl carbonate (DEC), 2-methyltetrahydrofuran (2-MeTHF) and dimethyl carbonate (DMC). In this regard, it should be noted that since metal carbonate as the endothermic substance is not soluble in the organic solvent, the metal carbonate needs to be contained in the cathode and/or the anode.

According to a second aspect of the present invention, there is provided a cathode composition for a lithium secondary battery containing a cathode active substance which can be dischargeably charged with lithium ions, an electrically conductive agent, a binder, and an endothermic substance which undergoes an endothermic reaction upon a temperature rise. As previously described, the endothermic substance may comprise a metal carbonate which is selected from a group including magnesium carbonate, cobalt(II) carbonate, silver carbonate, cadmium carbonate and sodium hydrogencarbonate.

The present invention will be apparent from the detailed description of the preferred embodiments given below with reference to the accompanying drawings.

DETAILED DESCRIPTION OF THE PREFERRED EMBODIMENTS

The preferred embodiments of the present invention will be described below with reference to the accompanying drawings.

Figure 1:
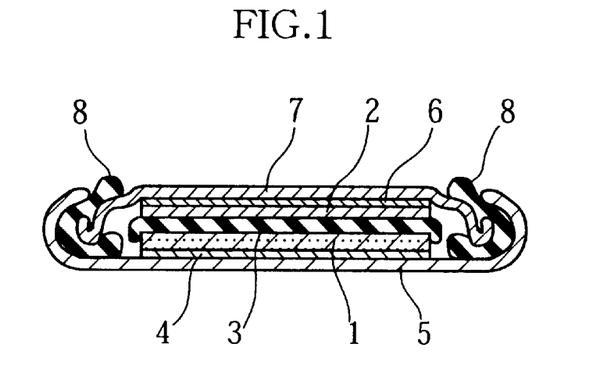
FIG. 1 is a sectional view showing a typical example of coin-type lithium secondary battery to which the present invention may be applied.
Figure 2:
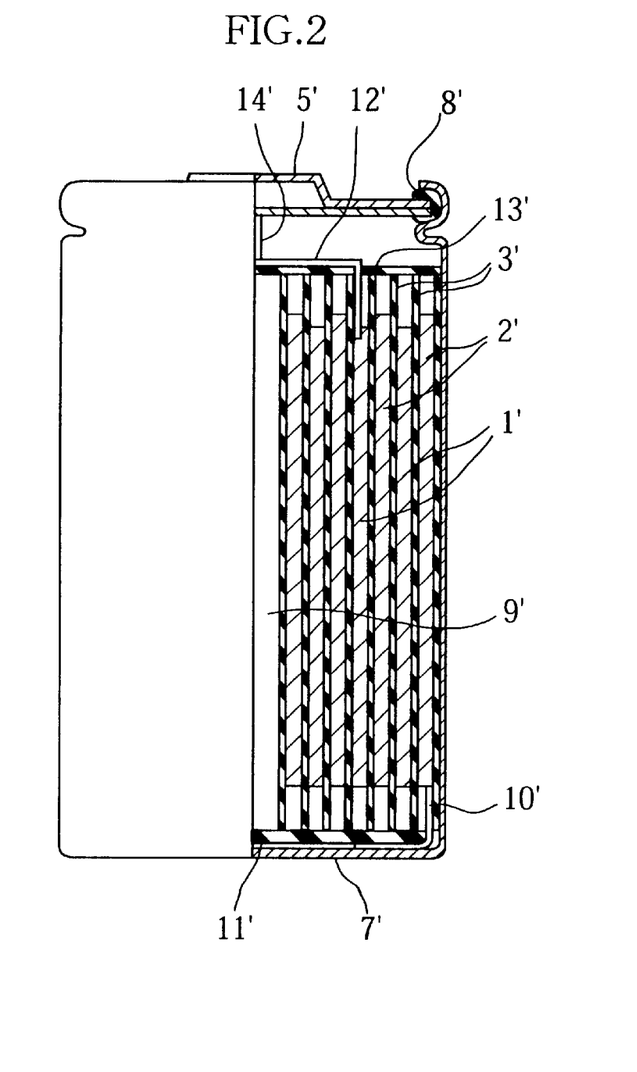
FIG. 2 is a sectional view showing a typical example of cylindrical lithium secondary battery to which the present invention may be applied.

FIGS. 1 and 2 of the accompanying drawings illustrate two typical examples of lithium secondary battery to which the present invention may be advantageously applied. Of these figures, FIG. 1 shows a coin-type battery, whereas FIG. 2 represents a cylindrical battery.

Referring first to FIG. 1, the coin-type lithium secondary battery includes a cathode 1 which contains $LiCoO_2$ as an active substance for example, an anode 2 made of e.g. a lithium foil, and a separator 3 made of e.g. a porous polypropylene or polyethylene film and interposed between the cathode 1 and the anode 2. The cathode 1 is formed on a cathode current collector 4 which is made of e.g. aluminum, and the cathode current collector 4 is attached on an inner surface of a cathode terminal 5 made of e.g. stainless steel. Similarly, the anode is formed on an anode current collector 6 which is made of e.g. aluminum, and the anode current collector 6 is attached on an inner surface of an anode terminal 7 made of e.g. stainless steel. The cathode terminal 5 and the anode terminal 7 form a container which is packed with a nonaqueous electrolytic solution prepared for example by dissolving $LiPF_6$ in an organic solvent mixture of ethylene carbonate (EC) and dimethyl carbonate (DMC). An annular packing 8 made of e.g. polypropylene is interposed between the cathode terminal 5 and the anode terminal 7 at the peripheral portions thereof to seal the container. In accordance with the present invention, the cathode 1 contains a metal carbonate (e.g. magnesium carbonate) as an endothermic substance.

Similarly, the cylindrical lithium secondary battery illustrated in FIG. 2 also includes a cathode 1' which contains $LiCoO_2$ as an active substance for example, an anode 2' made of e.g. a lithium foil, and a separator 3' made of e.g. a porous polypropylene or polyethylene film and interposed between the cathode 1' and the anode 2'. The laminate of the cathode 1', the anode 2' and the separator 3', which is originally a long strip of such a laminate (see FIG. 3), is helically wound around a center pin 9' and accommodated in a cylindrical anode terminal container 7' which may be made of e.g. stainless steel. Though not clear from FIGS. 2 and 3, the cathode 1' is prepared by applying a cathode composition on both surfaces of e.g. an aluminum foil as a cathode collector and rolling the cathode composition, whereas the anode 2' includes lithium foils (as an anode active substance) attached on both surfaces of e.g. a copper foil as an anode collector. In accordance with the present invention, the cathode 1' contains a metal carbonate (e.g. magnesium carbonate) as an endothermic substance.

The anode 2' is provided with an anode lead tab 10' which extends beyound a lower insulating plate 11' into contact with an inner bottom surface of the anode terminal container 7'. The cathode 1' is held in conduction with a cathode lead tab 12' which extends through an upper insulating plate 13' into electrical conduction with a cathode terminal lid 5' via a cathode lead pin 14'. The space formed by the combination of the cathode terminal lid 5' and the anode terminal container 7' is packed with a nonaqueous electrolytic solution prepared for example by dissolving $LiPF_6$ in an organic solvent mixture of ethylene carbonate (EC) and dimethyl carbonate (DMC). An annular packing 8' made of e.g. polypropylene is interposed between the cathode terminal lid 5' and the anode terminal container 7' for sealing purposes.

Next, examples of the present invention together with comparative examples will be specifically described.

EXAMPLE 1

Figure 3:
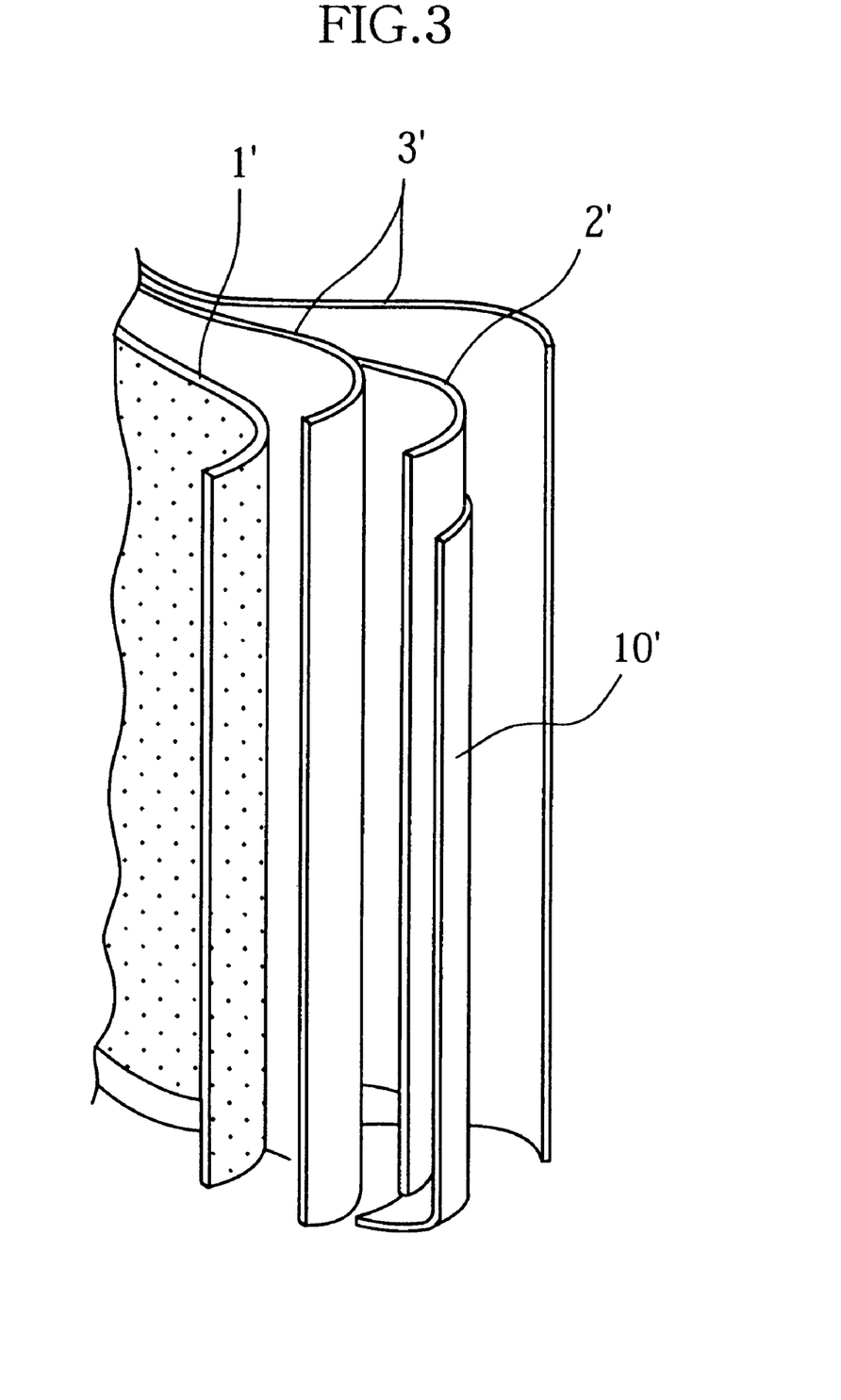
FIG. 3 is a fragmentary perspective view showing a laminate of cathode-anode-separator, partially exploded, which is incorporated in the cylindrical lithium secondary battery shown in FIG. 3.

In Example 1, a plurality of cylindrical lithium secondary batteries each having the structure shown in FIG. 3 were manufactured by incorporating a cathode, an anode, a separator and a nonaqeous electrolytic solution, as specified below. Each of the batteries, which had a diameter of 14 mm and a length of 50 mm, was subjected to a crushing test. In addition, the metal carbonate contained as an endothermic substance was subjected to the differential scanning calorimetry for confirmation of its endothermic effect.

Cathode:

For making a cathode composition, a uniform mixture was prepared which contained 81 wt % of LiCoC2 as a cathode active substance, 2.5 wt % of acetylene black plus 2.5 wt % of graphite as electrically conductive agents, 9 wt % of magnesium carbonate as an endothermic substance, and 5 wt % of poly(vinylidene fluoride) (PVDF) as a binder. The cathode composition thus obtained was applied to both surfaces of an aluminum foil as a cathode collector and rolled, thereby providing a cathode 1'.

Anode:

For providing an anode 2', a copper foil as an anode collector was sandwiched between lithium foils as an anode active substance.

Separator:

A porous polyethylene film was used as a separator 3'.

Electrolytic Solution:

$LiPF_6$ (lithium hexafluorophosphate) was dissolved in a 1:2 solvent mixture of ethylene carbonate (EC) and dimethyl carbonate (EM) for preparing an electrolytic solution having a concentration of 1 $mol/dm^3$.

Crushing Test:

Seven (7) samples of lithium secondary batteries were manufactured using the above-described elements, and each of the samples was subjected to a crushing test. In the crushing test, a presser rod (substantially square in cross section) pressed diametrically against a lengthwise center portion of the battery which had been charged up to a voltage of 4.2V for crushing the battery (center portion) to half of the original battery diameter. The results of the crushing test are shown in Table 1 where the notation "NGs" represents the number of samples which ignited due to excessive heat generation.

TABLE 1

Results of Crushing Test

| Identification of Batteries | NGs/Samples (Percentage) |
| --- | --- |
| Example 1 | 0/7 (0%) |
| Example 2 | 0/6 (0%) |
| Example 3 | 0/8 (0%) |
| Example 4 | 0/7 (0%) |
| Example 5 | 0/6 (0%) |
| Comparative Example | 10/10 (100%) |

Figure 4:
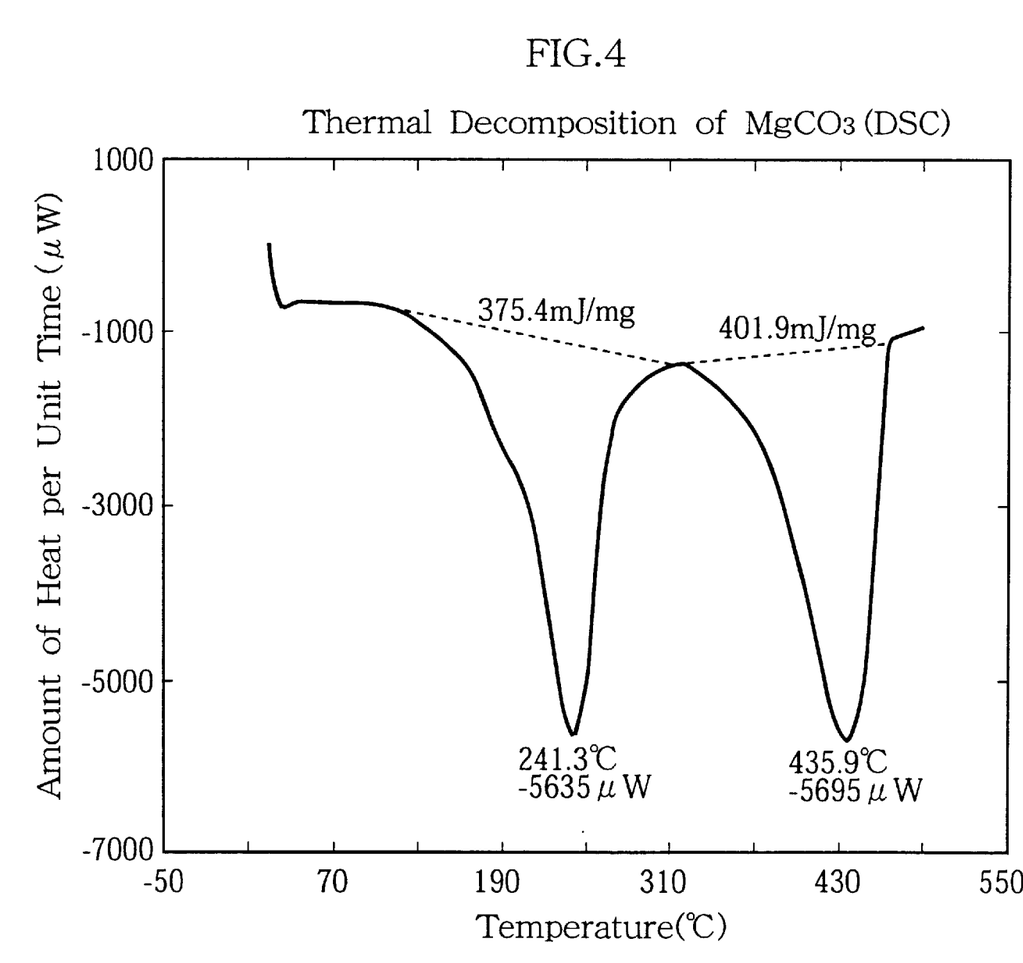
FIG. 4 is a graph showing the endothermic characteristics obtained by the differential scanning calorimetry of magnesium carbonate.
Figure 5:
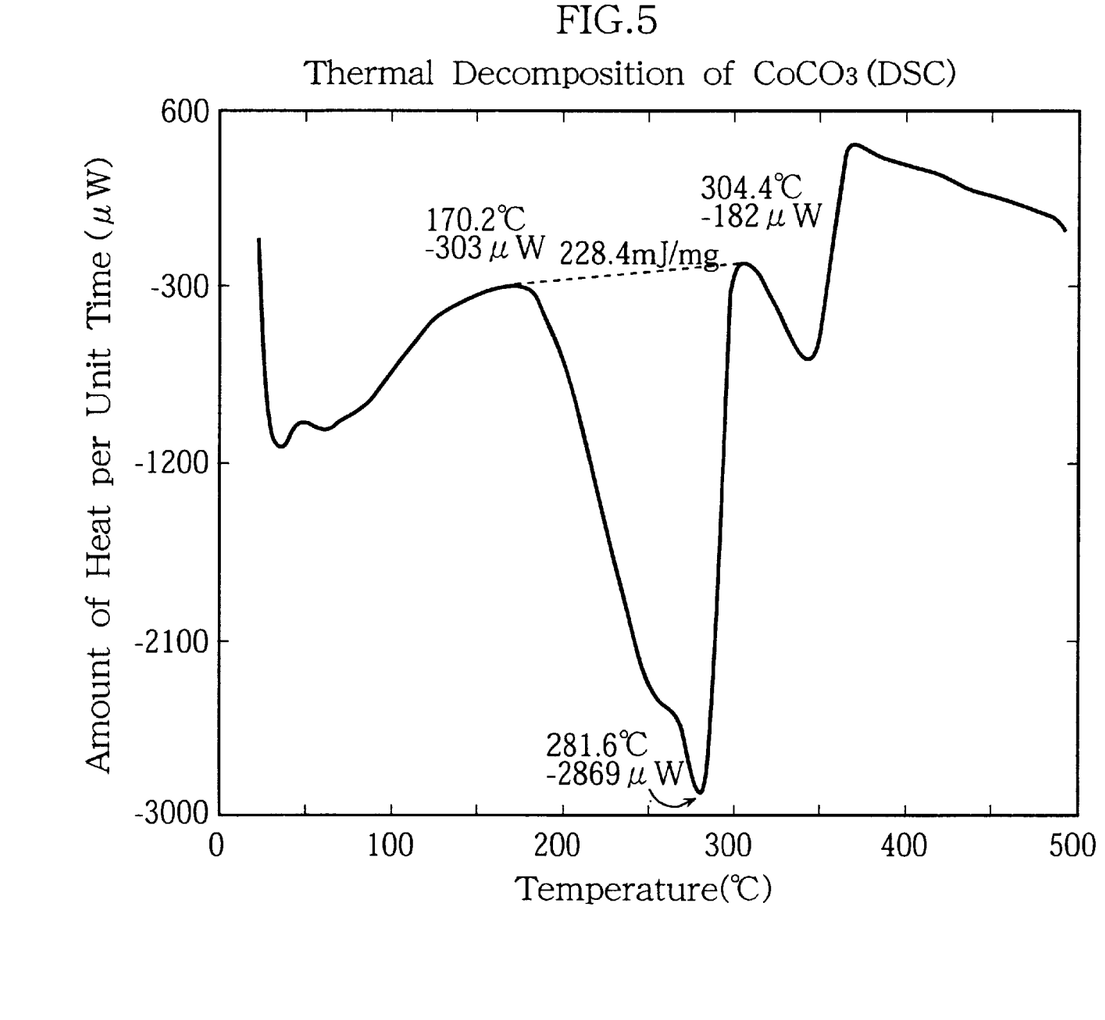
FIG. 5 is a graph showing the endothermic characteristics obtained by the differential scanning calorimetry of cobalt (II) carbonate.
Figure 6:
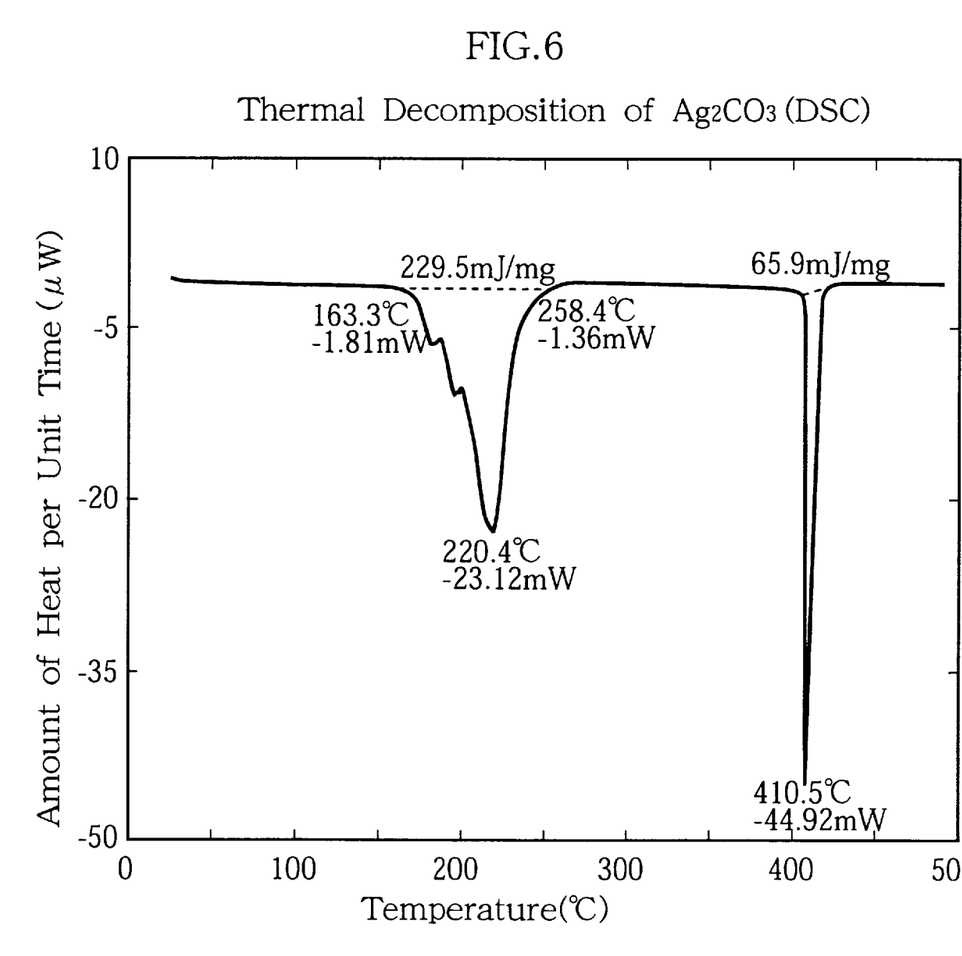
FIG. 6 is a graph showing the endothermic characteristics obtained by the differential scanning calorimetry of silver carbonate.
Figure 7:
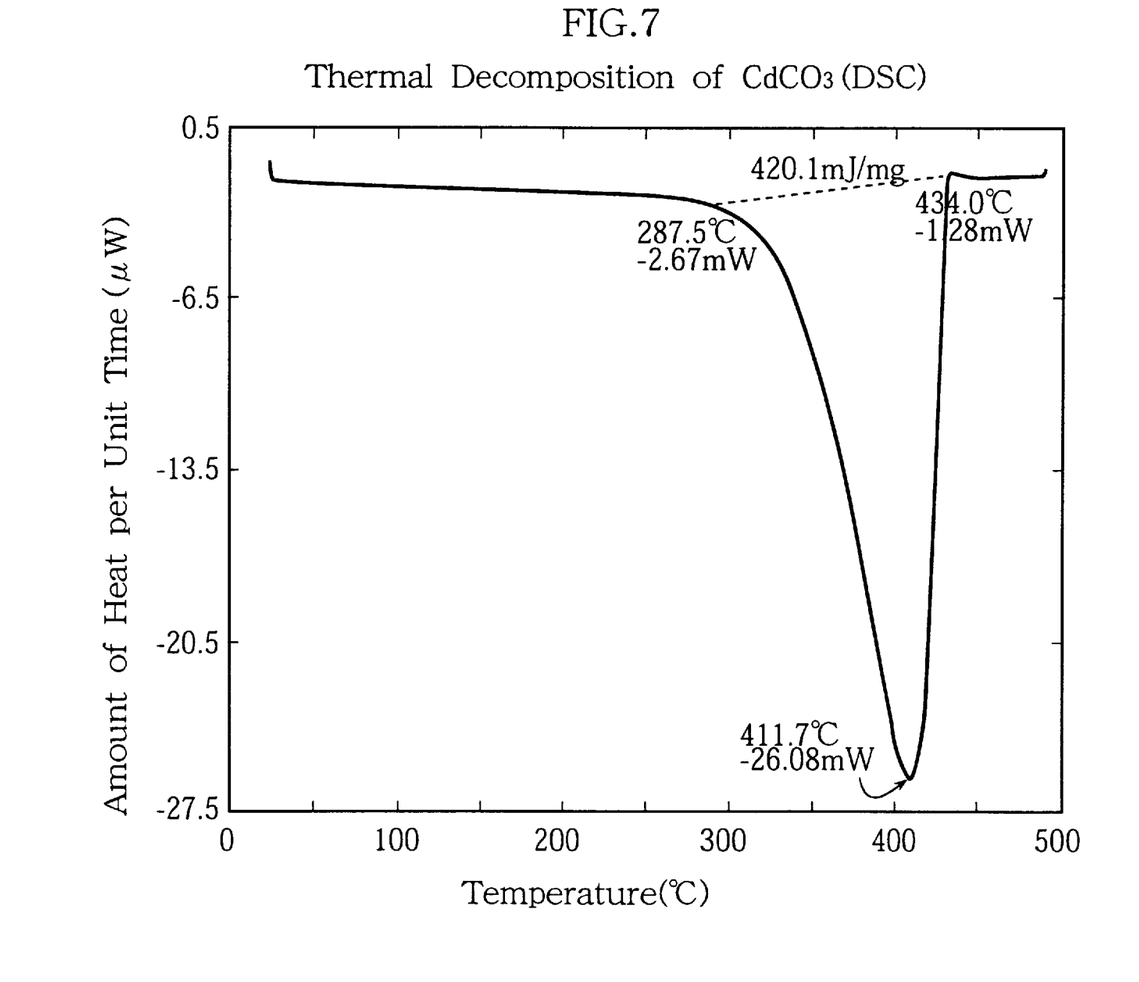
FIG. 7 is a graph showing the endothermic characteristics obtained by the differential scanning calorimetry of cadmium carbonate.
Figure 8:
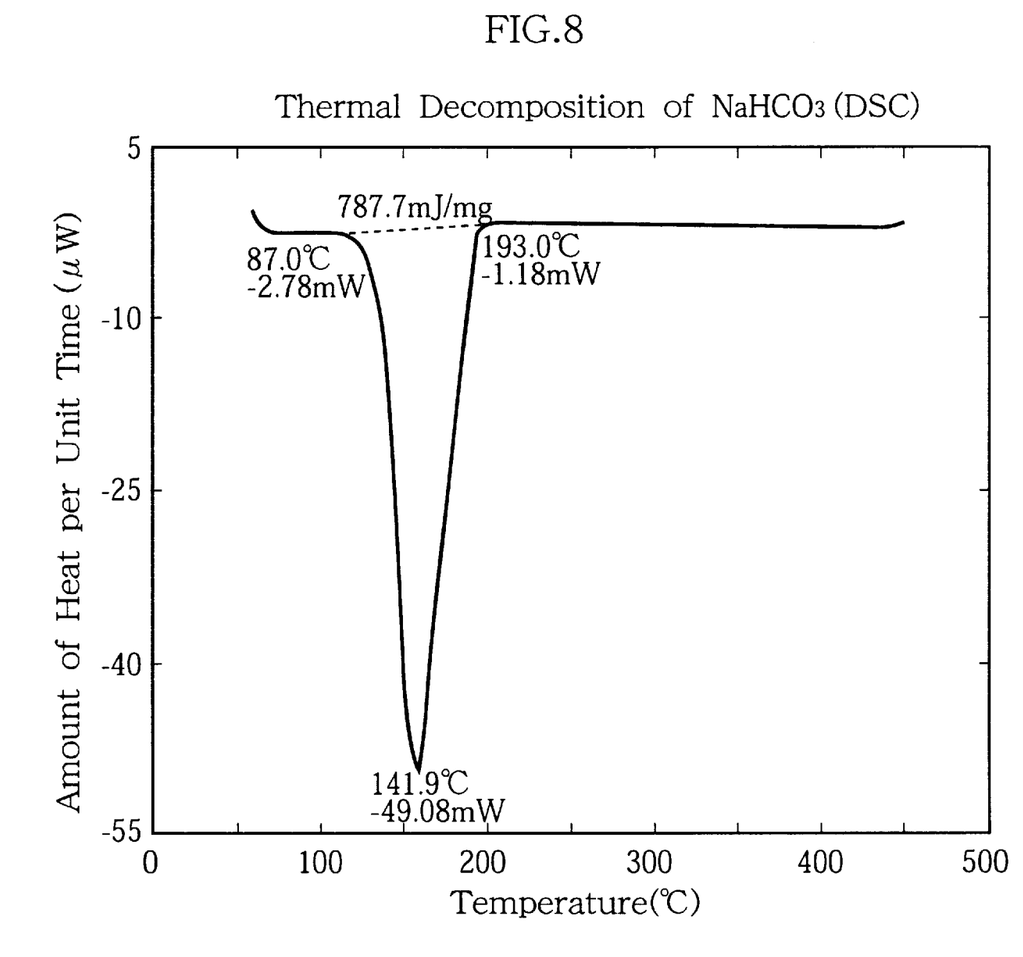
FIG. 8 is a graph showing the endothermic characteristics obtained by the differential scanning calorimetry of sodium hydrogencarbonate.

Confirmation Test for Endothermic Effect:

In addition to the above-described crushing test, the magnesium carbonate contained in the cathode composition was subjected to the differential scanning calorimetry for confirmation of its endothermic effect. More specifically, the magnesium carbonate was thermally decomposed by heating at a speed of 10° C./min from 25° C. to 500° C. with a differential scanning calorimeter (DSC-100 available from Seiko Electronic Industries Co. Ltd., Japan). The results of the differential scanning calorimetry are shown in FIG. 4. With regard to FIG. 4 (and FIGS. 5~8 as well), the minus (−) sign indicates the absorption of heat, whereas the area of the regions encircled by the heat variation curve and the broken lines represents the integral of heat (i.e., total heat) absorbed by the metal carbonate.

EXAMPLE 2

In Example 2, six (6) samples of cylindrical lithium secondary batteries identical to those of Example 1 except for the use of cobalt (II) carbonate as an endothermic substance were manufactured. Each of the samples was subjected to a crushing test. In addition, the cobalt (II) carbonate used in this example was subjected to the differential scanning calorimetry for confirmation of its endothermic effect. The results of both tests are shown in Table 1 and FIG. 5, respectively.

EXAMPLE 3

In Example 3, eight (8) samples of cylindrical lithium secondary batteries identical to those of Example 1 except for the use of silver carbonate as an endothermic substance were manufactured. Each of the samples was subjected to a crushing test. In addition, the silver carbonate used in this example was subjected to the differential scanning calorimetry for confirmation of its endothermic effect. The results of both tests are shown in Table 1 and FIG. 6, respectively.

EXAMPLE 4

In Example 4, seven (7) samples of cylindrical lithium secondary batteries identical to those of Example 1 except for the use of cadmium carbonate as an endothermic substance were manufactured. Each of the samples was subjected to a crushing test. In addition, the cadmium carbonate used in this example was subjected to the differential scanning calorimetry for confirmation of its endothermic effect. The results of both tests are shown in Table 1 and FIG. 7, respectively.

EXAMPLE 5

In Example 5, six (6) samples of cylindrical lithium secondary batteries identical to those of Example 1 except for the use of sodium hydrogencarbonate as an endothermic substance were manufactured. Each of the samples was subjected to a crushing test. In addition, the sodium hydrogencarbonate used in this example was subjected to the differential scanning calorimetry for confirmation of its endothermic effect. The results of both tests are shown in Table 1 and FIG. 8, respectively.

COMPARATIVE EXAMPLE

For comparison, ten (10) samples of cylindrical lithium secondary batteries identical to those of Example 1 except for the use of a different cathode composition were manufactured. The cathode composition used in this comparative example is a uniform mixture containing 90 wt % of $LiCoC_2$ as a cathode active substance, 2.5 wt % of acetylene black plus 2.5 wt % of graphite as electrically conductive agents, and 5 wt % of poly (vinylidene fluoride) (PVDF) as a binder. Each of the samples was subjected to a crushing test. The results of the crushing test are shown in Table 1.

[Evaluation]

As noted from Table 1, all of the battery samples made in Examples 1~5 did not experience excessive heat generation nor ignition in the crushing test. This fact clearly indicates that the endothermic substance (i.e., each of the different metal carbonates added to the cathode composition in each of Examples 1~5) contained in the battery fulfilled its endothermic function for effectively preventing excessive heat generation of the battery. By contrast, the battery samples of Comparative Example containing no endothermic substance equally suffered ignition in the crushing test due to excessive heat generation.

Further, as understood from FIGS. 4~8, the metal carbonate used in each of a Examples 1~5 exhibited one or two heat absorption peaks at a temperature or temperatures below 500° C. This indicates that the prevention of excessive heat generation is attributable to the endothermic thermal decomposition of the metal carbonate.

Therefore, it is concluded that the lithium secondary battery according to the present invention is advantageous for its high safety even under severe conditions such as battery crushing, nail piercing, internal shorting, high-temperature exposure and/or external shorting.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

What is claimed is:

1. A lithium secondary battery comprising:
   a cathode which can be dischargeably charged with lithium ions;
   an anode selected from a group including lithium metal, a lithium alloy and any other anode material which can be releasably doped with lithium ions;
   an electrolyte which allows migration of lithium ions between both electrodes; and
   an endothermic substance which undergoes an endothermic reaction upon a temperature rise of the battery for preventing excessive heat generation, the endothermic substance contained in the anode.

2. The lithium secondary battery according to claim 1, wherein the endothermic substance comprises at least one metal carbonate which thermally decomposes upon a temperature rise of the battery.

3. The lithium secondary battery according to claim 2, wherein the metal carbonate is selected from a group including magnesium carbonate, cobalt (II) carbonate, silver carbonate, cadmium carbonate and sodium hydrogencarbonate.

4. The lithium secondary battery according to claim 1, wherein the electrolyte comprises a nonaqueous electrolytic solution which is prepared by dissolving a lithium-ion-conductive solute in an organic solvent.

5. The lithium secondary battery according to claim 4, wherein the lithium-ion-conductive solute is selected from a group including $LiPF_6$, $LiBF_4$ and $LiClO_4$.

6. The lithium secondary battery according to claim 4, wherein the organic solvent is selected from a group including propylene carbonate, tetrahydrofuran, ethylene carbonate, 1,2-dimethoxyethane, diethyl carbonate, 2-methyl-tetrahydrofuran and dimethyl carbonate.

7. A cathode composition for a lithium secondary battery, the cathode composition containing a cathode active substance which can be dischargeably charged with lithium ions, an electrically conductive agent, a binder, and an endothermic substance which undergoes an endothermic reaction upon a temperature rise, said endothermic substance comprising at least one metal carbonate which thermally decomposes upon a temperature rise of the battery, said metal carbonate selected from the group consisting of magnesium carbonate, cobalt (II) carbonate, silver carbonate, cadmium carbonate and sodium hydrogencarbonate.

8. The cathode composition according to claim 7, wherein the metal carbonate is added in a proportion of 0.1~20 wt % of the cathode composition.

9. The cathode composition according to claim 7, wherein the cathode active substance is selected from a group including $LiCoO_2$, $LiNiO_2$, $LiMnO_2$, $LiMn_2O_4$ and $V_2O_5$.

10. The cathode according to claim 7, wherein the electrically conductive agent is selected from a group including acetylene black and graphite.

11. The cathode according to claim 7, wherein the binder is selected from a group including poly(vinylidene fluoride), polytetrafluoroethylene and ethylene-propylene-diene ternary copolymer.

12. A lithium secondary battery comprising:
a cathode which can be dischargeably charged with lithium ions;
an anode selected from a group including lithium metal, a lithium alloy and any other anode material which can be releasably doped with lithium ions;
an electrolyte which allows migration of lithium ions between both electrodes; and
an endothermic substance which undergoes an endothermic reaction upon a temperature rise of the battery for preventing excessive heat generation, said endothermic substance comprising at least one metal carbonate which thermally decomposes upon a temperature rise of the battery, said metal carbonate selected from the group consisting of magnesium carbonate, cobalt (II) carbonate, silver carbonate, cadmium carbonate and sodium hydrogencarbonate.

13. The lithium secondary battery according to claim 12, wherein the electrolyte comprises a nonaqueous electrolytic solution which is prepared by dissolving a lithium-ion-conductive solute in an organic solvent.

14. The lithium secondary battery according to claim 13, wherein the lithium-ion-conductive solute is selected from a group including $LiPF_6$, $LiBF_4$ and $LiClO_4$.

15. The lithium secondary battery according to claim 13, wherein the organic solvent is selected from a group including propylene carbonate, tetrahydrofuran, ethylene carbonate, 1,2-dimethoxyethane, diethyl carbonate, 2-methyl-tetrahydrofuran and dimethyl carbonate.

* * * * *